(12) United States Patent
Gouriou et al.

(10) Patent No.: US 7,017,153 B2
(45) Date of Patent: *Mar. 21, 2006

(54) UNINSTRUMENTING IN-LINE CODE INSTRUMENTATION VIA STACK UNWINDING AND CLEANUP

(75) Inventors: Eric Gouriou, Sunnyvale, CA (US); Robert Hundt, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 481 days.

This patent is subject to a terminal disclaimer.

(21) Appl. No.: 10/016,953

(22) Filed: Dec. 13, 2001

(65) Prior Publication Data

US 2003/0135847 A1 Jul. 17, 2003

(51) Int. Cl.
*G06F 9/45* (2006.01)
*H02H 3/05* (2006.01)

(52) U.S. Cl. .............. 717/158; 717/114; 717/131; 717/153; 717/154; 714/35; 714/38

(58) Field of Classification Search ........ 717/124–165, 717/114, 116, 118; 714/100, 2, 35, 38, 48
See application file for complete search history.

(56) References Cited

U.S. PATENT DOCUMENTS

| 6,192,513 B1 * | 2/2001 | Subrahmanyam ........... 717/155 |
| 6,253,317 B1 * | 6/2001 | Knapp et al. .............. 712/244 |
| 6,470,493 B1 * | 10/2002 | Smith et al. .............. 717/130 |

* cited by examiner

*Primary Examiner*—Antony Nguyen-Ba

(57) ABSTRACT

A method and system for reverting a process in an in-line instrumented state to an uninstrumented state. In one embodiment, the present invention modifies selected text segment portions from the process to be uninstrumented. The present embodiment then unmaps instrumented code space such that the instrumented code space is inaccessible to the process. In this embodiment, the present invention also cleans a call stack of the process by unwinding the call stack and resetting the storage locations for return pointers from the instrumented code space to uninstrumented code space.

27 Claims, 7 Drawing Sheets

UNINSTRUMENTING IN-LINE CODE INSTRUMENTATION VIA STACK UNWINDING AND CLEANUP

TECHNICAL FIELD

The present claimed invention relates to instrumentation of a computer program during execution. More specifically, the present claimed invention relates to reverting an instrumented process to an uninstrumented state.

BACKGROUND ART

Code instrumentation is a method for analyzing and evaluating program code performance. In one approach to code instrumentation, new instructions (or probe code) are added to the program, and, consequently, the original code in the program is changed and/or relocated. Some examples of probe code include adding values to a register, moving the content of one register to another register, moving the address of some data to some registers, etc. The changed and/or relocated code is referred to as instrumented code or, more generally, as an instrumented process. For purposes of the present discussion, instrumented code is one type of dynamically generated code. Although the following discussion explicitly recites and discusses code instrumentation, such discussion and examples are for illustration only. That is, the following discussion also applies to various other types of dynamically generated code.

One specific type of code instrumentation is referred to as dynamic binary instrumentation. Dynamic binary instrumentation allows program instructions to be changed on-the-fly. Measurements such as basic-block coverage and function invocation counting can be accurately determined using dynamic binary instrumentation. Additionally, dynamic binary instrumentation, as opposed to static instrumentation, is performed at run-time of a program and only instruments those parts of an executable that are actually executed. This minimizes the overhead imposed by the instrumentation process itself. Furthermore, performance analysis tools based on dynamic binary instrumentation require no special preparation of an executable such as, for example, a modified build or link process.

Unfortunately, dynamic binary instrumentation does have some disadvantages associated therewith. For example, because the binary code of a program is modified when using dynamic binary instrumentation methods, all interactions with the processor and operating system may change significantly, for example a program's cache and paging behavior. As a result, dynamic binary instrumentation is considered to be intrusive. Also, due to the additional instructions introduced by dynamic binary instrumentation, process execution time can slow to anywhere from some small amount of increased run time to multiples of the run time of the non-instrumented process.

In one approach, dynamic binary instrumentation is performed in an in-line manner. That is, probe code is inserted into a code stream of interest. As a result, existing code must be relocated to new memory space because of increase in size of the original code stream due to the addition of probe code instructions. As compared to out-of-line approaches, an in-line approach leads to more compact code, less intrusion, and better performance. That is, in a typical out-of-line approach, a function's entry point is instrumented with a long branch to a trampoline that executes the instruction plus additional code related to the instrumentation taking place. In the in-line approach, such long branching to the trampoline is avoided. However, an in-line strategy does have drawbacks. For example, the insertion of probe code changes the relative offsets in a code stream and requires lookup of indirect branches (e.g. in a translation table) whose target cannot be determined by the instrumentor. Also, combining different instrumentations and probe code is not as easy as it is in certain out-of-line approaches. One drawback associated with in-line instrumented processes is particularly troublesome. Namely, in some instances it is desirable or necessary to reverse the dynamic binary in-line instrumentation operation, i.e., to undo the instrumentation and revert back to executing the original code. For example, "undoing" the instrumentation (i.e. uninstrumenting a process) is useful when an application is to be measured for only a part of its total runtime.

As another example, uninstrumentation may also be desired due to the following circumstance. Assume that a process has been instrumented to collect certain measurements. This process being measured (the parent process) may create new processes (the child processes). In UNIX, the most common way to create a new process is to call the C function fork( ) from the parent process. It may be required to exclude some (or all) of the child processes from the measurement of the parent process. That is, it is possible that the child process will inherit the parent's complete context. As is the case in dynamic binary in-line instrumentation, this complete context includes the parent's program text (i.e. instructions) that may have been modified by instrumentation as well as the call chain through instrumented functions in instrumented code space, as well as the stack. The instrumented code space can be generated by calling the target application's memory allocator, by mapping of shared memory, or by reserving an address range on the target application's stack. If no special handling is done at this point, the child process will execute the inherited instrumented code from the parent, thereby perturbing the measurements being made exclusively on the parent process.

Also, in certain environments such as, for example, IA-64 Itanium processor architecture by Intel Corporation of Santa Clara, Calif., the runtime architecture defines function calls, preserved registers, and conventions for passing parameters. Unfortunately, the unwind process which is readily performed in certain environments is particularly problematic in an IA-64 architecture. As one example, in the IA-64 architecture, unlike most architectures, return pointers are not stored in a common fixed location. As a result, unwind operations in the IA-64 environment are especially difficult to perform.

Thus, a need has arisen for a method and system for reverting a process in an in-line instrumented state to an uninstrumented state. A further need exists for a method and system for reverting a process in an in-line instrumented state to an uninstrumented state when return pointers of the process are not stored in a common fixed location.

DISCLOSURE OF THE INVENTION

The present invention provides a method and system for reverting a process in an in-line instrumented state to an uninstrumented state. The present invention further provides a method and system for reverting a process in an in-line instrumented state to an uninstrumented state when return pointers of the process are not stored in a common fixed location.

Specifically, in one method embodiment, the present invention modifies selected text segment portions from the process to be uninstrumented. The present embodiment then unmaps instrumented code space such that the instrumented code space is inaccessible to the process. In this embodiment, the present invention also cleans a call stack of the process by unwinding the call stack and resetting the storage locations for return pointers from the instrumented code space to uninstrumented code space.

These and other technical advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODES FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "modifying", "unmapping", "updating", "executing", "unwinding", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Computer System Environment of the Present Invention

Figure 1:
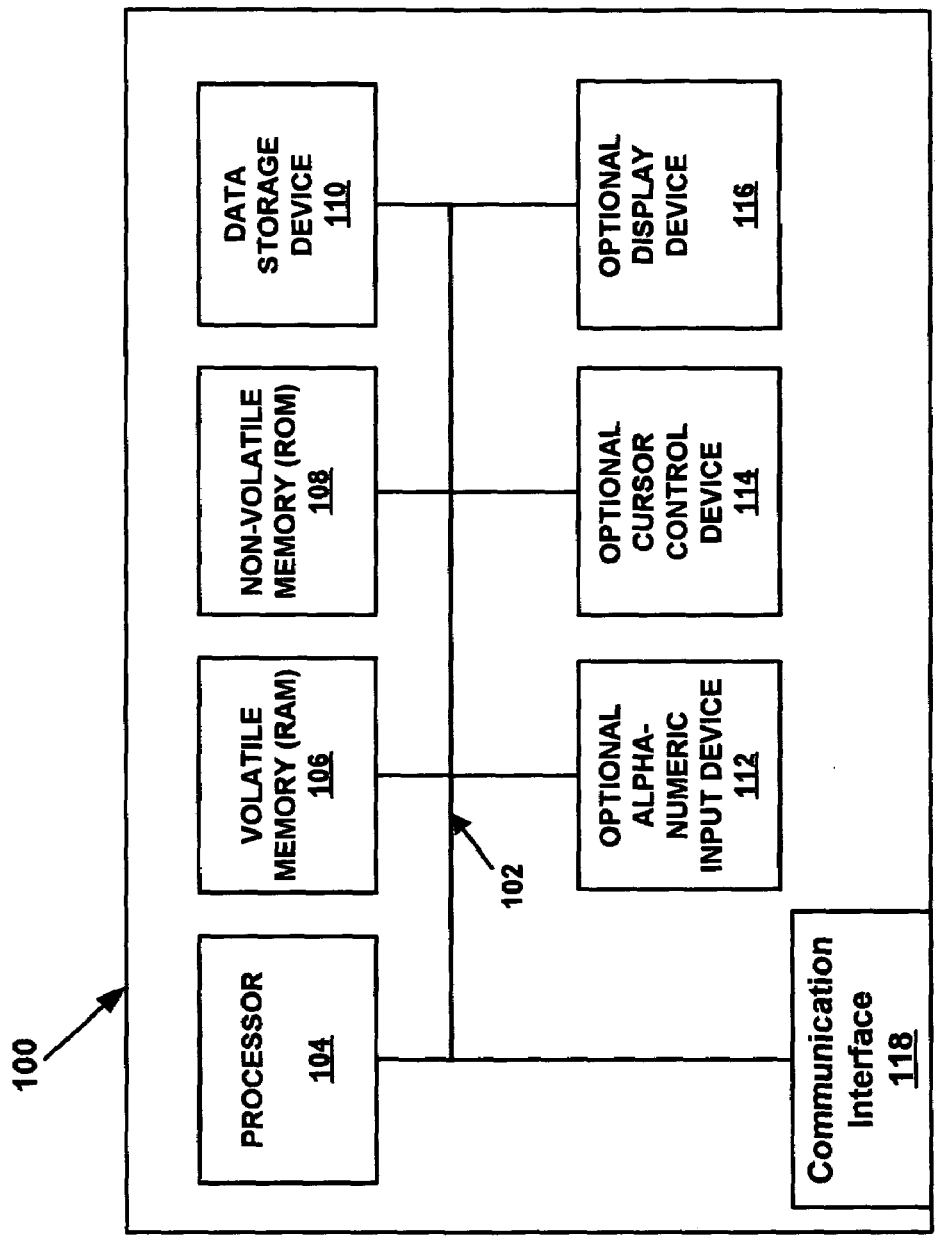
FIG. 1 is a schematic diagram of an exemplary computer system used to perform steps of the present method in accordance with various embodiments of the present claimed invention.

With reference now to FIG. 1, portions of the present method and system are comprised of computer-readable and computer-executable instructions which reside, for example, in computer-usable media of a computer system. FIG. 1 illustrates an exemplary computer system 100 used in accordance with one embodiment of the present invention. It is appreciated that system 100 of FIG. 1 is exemplary only and that the present invention can operate on or within a number of different computer systems including general purpose networked computer systems, embedded computer systems, routers, switches, server devices, client devices, various intermediate devices/nodes, stand alone computer systems, and the like. Additionally, computer system 100 of FIG. 1 is well adapted having computer readable media such as, for example, a floppy disk, a compact disc, and the like coupled thereto. Such computer readable media is not shown coupled to computer system 100 in FIG. 1 for purposes of clarity. Additionally, portions of the present embodiment are well suited to operating in conjunction with various mobile clients such as, for example, a cell phone, personal digital assistant (PDA), laptop computer, pager, and the like.

System 100 of FIG. 1 includes an address/data bus 102 for communicating information, and a central processor unit 104 coupled to bus 102 for processing information and instructions. As an example, central processor unit 104 may be an IA-64 microprocessor architecture by Intel Corporation of Santa Clara, Calif. System 100 also incudes data storage features such as a computer usable volatile memory 106, e.g. random access memory (RAM), coupled to bus 102 for storing information and instructions for central processor unit 104. System 100 also includes computer usable non-volatile memory 108, e.g. read only memory (ROM), coupled to bus 102 for storing static information and instructions for the central processor unit 104. Such static information is comprised, in one embodiment, of commands for configuration and initial operations of computer system 100. Computer system 100 also includes a data storage unit 110 (e.g., a magnetic or optical disk and disk drive) coupled to bus 102 for storing information and instructions.

System 100 of the present invention also includes an optional alphanumeric input device 112 including alphanumeric and function keys coupled to bus 102 for communicating information and command selections to central processor unit 104. System 100 also optionally includes an optional cursor control device 114 coupled to bus 102 for communicating user input information and command selections to central processor unit 104. System 100 of the present embodiment also includes an optional display device 116 coupled to bus 102 for displaying information. System 100 of the present embodiment also includes a communication interface 118 which enables computer system 100 to interface with other computers or devices. In one embodiment, communication 118 is, for example, a modem, an integrated services digital network (ISDN) card or the like, a local area network (LAN) port, etc. Those skilled in the art will recognize that modems or various types of network interface cards (NICs) typically provide data communications via telephone lines, while a LAN port provides data communications via a LAN. Communication interface 118 of computer system 100 may also enable wireless communications. Furthermore, communication interface 118 may enable communication with other computers or devices through one or more networks. For example, computer system 100, using communication interface 118, may communicate to the "Internet."

Computer system 100 may be used to implement the techniques described below. In various embodiments, processor 104 performs the steps of the techniques by executing instructions brought to RAM 106. In alternative embodiments, hard-wired circuitry may be used in place of or in combination with software instructions to implement the described techniques. Consequently, embodiments of the invention are not limited to any one or a combination of software, hardware, or circuitry.

Instructions executed by processor 104 may be stored in and carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punch-cards, or any other physical medium having patterns of holes, a RAM, a ROM, an EPROM, or any other memory chip or cartridge. Computer-readable media may also be coaxial cables, copper wire, fiber optics, acoustic, or light waves, etc. As an example, the instructions to be executed by processor 104 are in the form of one or more software programs and are initially stored in a CD-ROM being interfaced with computer system 100. Computer system 100 loads these instructions in RAM 106, executes some instructions, and sends some instructions via communication interface 118, a modem, and a telephone line to a network, the Internet, etc. A remote computer, receiving data through a network cable, executes the received instructions and sends the data to computer system 100 to be stored in storage device 110.

Referring still to FIG. 1, optional display device 116 of FIG. 1, may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well suited to directing a cursor by other means such as, for example, voice commands. A more detailed discussion of the present invention is found below.

General Method and System for Uninstrumenting In-Line Code Instrumentation On-The-Fly As an overview, the present embodiment provides a method and system for reverting a process in an in-line instrumented state to an uninstrumented state.

With reference next to flow chart 200 and to FIG. 1, exemplary steps used by the various embodiments of present invention are illustrated. Flow chart 200 includes processes of the present invention which, in one embodiment, are carried out by a processor under the control of computer-readable and computer-executable instructions. The computer-readable and computer-executable instructions reside, for example, in data storage features such as computer usable volatile memory 106, computer usable non-volatile memory 108, and/or data storage device 110 of FIG. 1. In one embodiment, the computer-readable and computer-executable instructions are used to control or operate in conjunction with, for example, processor 104 of FIG. 1.

Figure 2:
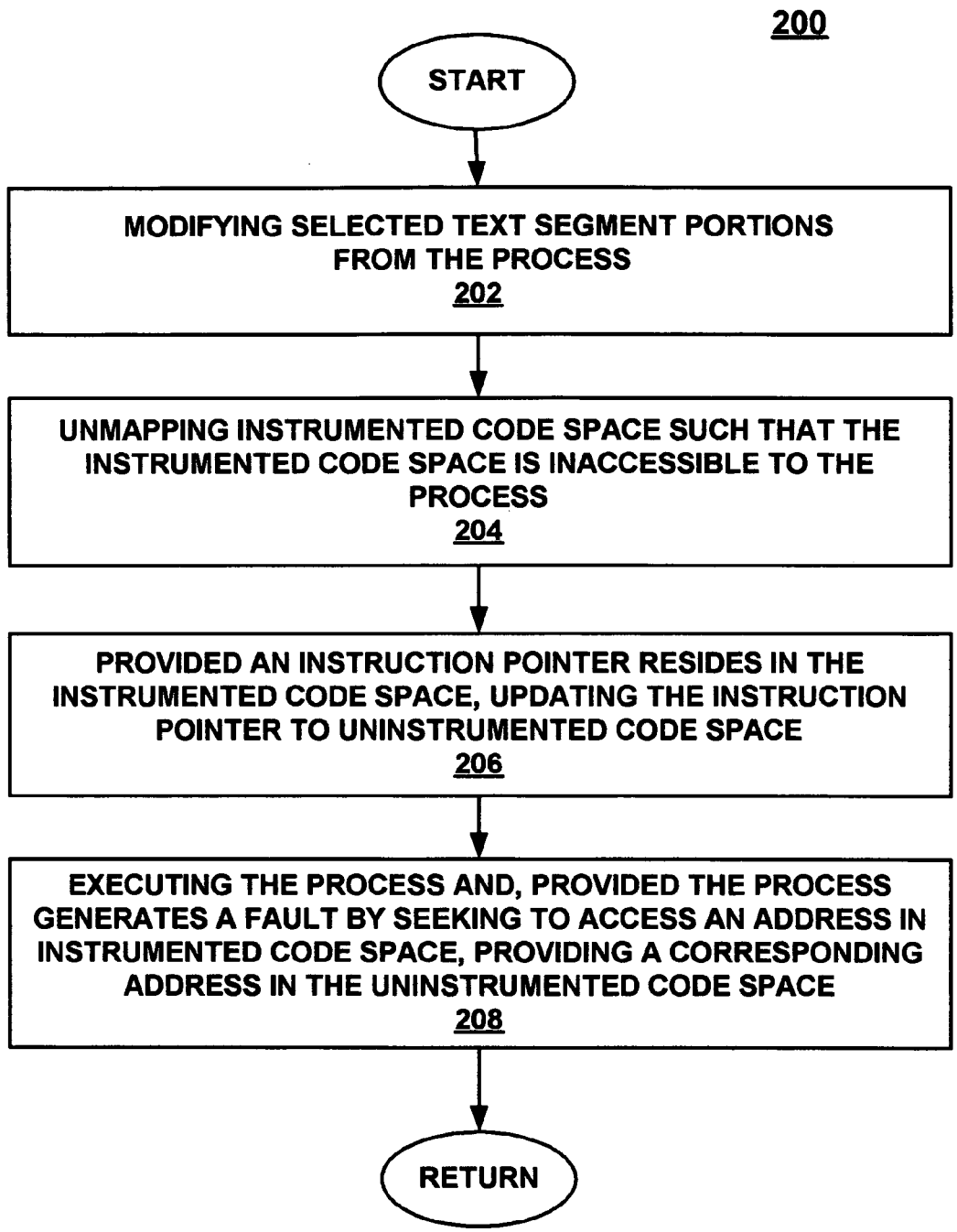
FIG. 2 is a flow chart of steps performed in accordance with one embodiment of the present claimed invention.

With reference again to FIG. 2, steps performed in accordance with one embodiment of the present invention are shown. Although specific steps are disclosed in flow chart 200 of FIG. 2, such steps are exemplary. That is, the present invention is well suited to performing various other steps or variations of the steps recited in FIG. 2. At step 202, the present embodiment, modifies selected text segment portions from the process which has been instrumented. As was mentioned above, the need for uninstrumentation may arise when a child process inherits the instrumented parent process' complete context including the parent's program text that may have been modified by instrumentation. In such a case, if no special handling is done at this point, the child process will execute the inherited instrumented code from the parent, thereby perturbing the measurements intended to be made exclusively on the parent process. In order to exclude the child process from any measurements, uninstrumentation as is taught by the present invention is performed on the child process.

With reference still to step 202, in one embodiment, the present invention modifies selected text segment portions to remove breakpoints, restore inserted branches with their original content, restore switch tables, restore procedure lookup tables (PLTs) to original values. In so doing, the instrumented process now more closely resembles the uninstrumented process. Specifically, the text segment is reverted to its original state. In one embodiment, processor 104 of FIG. 1 in conjunction with instructions, residing, for example, in RAM 106, ROM 108, and/or data storage device 110, comprise an apparatus which operates to perform step 202. Additional details related to instrumentation including discussion of features such as breakpoints, branches, switch tables, procedure lookup tables (PLTs) can be found in co-owned, commonly-assigned U.S. patent application Ser. No. 09/833,248 filed Apr. 11, 2001, entitled "Dynamic Instrumentation Of An Executable Program", to Hundt et al. which is incorporated herein by reference as background material.

As recited at step 204, the present embodiment also unmaps instrumented code space such that the instrumented code space is inaccessible to the process which is being uninstrumented. The present invention performs this step to rectify, for example, the case wherein the child process inherits the instrumented parent process' complete context including the mapped shared memory segments. Also, in one embodiment control transfers to the instrumented code in shared memory via branches in the text section are undone by restoring the process's original text segment. Similarly, in one embodiment, patched data such as switch tables are restored to their original state.

Referring still to step 204, in one embodiment, the instrumented code space is comprised of shared memory. Although shared memory is specifically recited as comprising the instrumented code space in the present embodiment, the present invention is well suited to umapping from various other types of instrumented code space other than shared memory. In one embodiment, processor 104 of FIG. 1 in conjunction with instructions residing, for example, in RAM 106, ROM 108, and/or data storage device 110 comprise an apparatus which operates to perform step 204.

Referring now to step 206, the present invention also updates an instruction pointer to uninstrumented code space; provided an instruction pointer resides in instrumented code space. Once again, the present invention performs this step to rectify, for example, the case wherein the child process inherits the instrumented parent process' complete context including the parent's return call stack. However, when in-line instrumentation is used, the call stack of the process to be uninstrumented will contain addresses in the instrumented address range. One source of complexity in the uninstrumentation phase comes from the necessity to clean up this call stack. A detailed illustration of the present embodiment's performance of step 206 is presented below.

Figure 3:
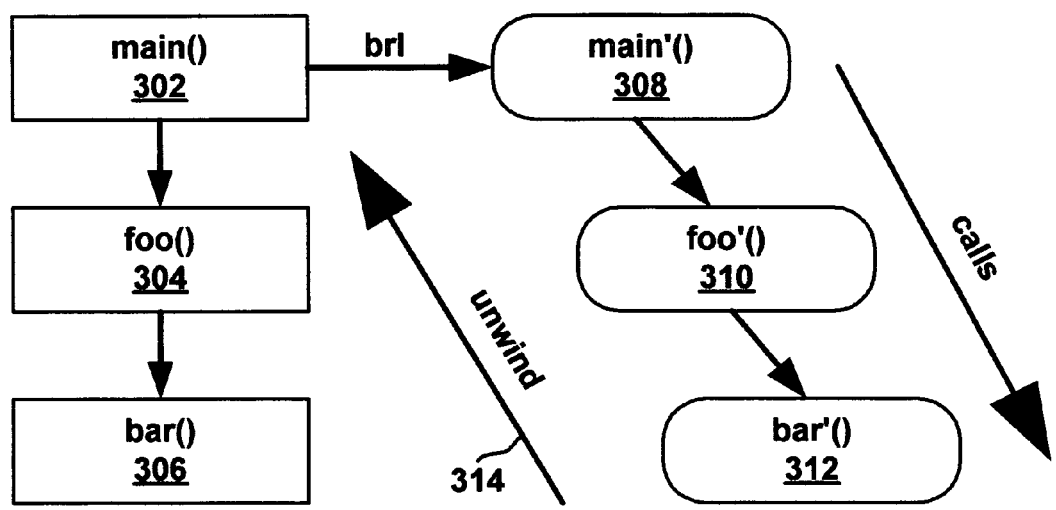
FIG. 3 is an original call graph and a corresponding instrumented call graph in accordance with one embodiment of the present claimed invention.

With reference now to FIG. 3, an original and a corresponding instrumented call graph 300 is shown. As shown in FIG. 3, assume function main( ) 302 calls function foo( ) 304 which calls function bar( ) 306 as shown below:

| main( ) | foo( ) | bar( ) |
|---|---|---|
| { | { | { |
| foo( ); | bar( ); | ... |
| } | } | } |

After instrumentation, the resulting call stack will contain instrumented functions as indicated in FIG. 3. In FIG. 3, unwinding traverses the call graph upwards as indicated by arrow 314. In certain environments such as, for example, IA-64 Itanium processor architecture by Intel Corporation of Santa Clara, Calif., the runtime architecture defines function calls, preserved registers, and conventions for passing parameters. For purposes of the below explanation, one method of the present invention is described as it would be implemented in such an environment. It should be understood, however, that such an example is exemplary only, and the present invention is not limited solely to use in such an environment. Furthermore, it should be noted that the unwind process which is readily performed in certain environments is particularly problematic in an IA-64 architecture. More specifically, in an IA-64 architecture, a system library "libunwind" is employed to facilitate the unwind process.

Referring still to FIG. 3 and also to step 206, to perform a call, a br.call instruction assigns the return address to a branch register—the return pointer (rp)—before branching to the target address. If the called function (the callee) plans to perform other calls, it has to save and restore the return pointer. On return of a function, a br.ret instruction uses the return pointer to return to the address after the original br.call. On the IA-64 architecture, such an address would be the bundle address after the bundle that contains the call.

The return pointer can be stored in a variety of places, on the memory stack, in a preserved register, in a stacked register, in another branch register. The information where the return pointer is saved is stored in the unwind information present in the process' ELF file, along with other information. The compiler generated code will reload the return pointer from the correct resource, before performing a function return. In the present embodiment, an instruction pointer (IP) residing in an instrumented function bar'( ) 312 must be reset to the corresponding IP in the non-instrumented function bar( ) 306. If bar'( ) 312 has been called from the instrumented function foo'( ) 310, the return pointer will contain an address within the instrumented foo'( ) 310. If the return pointer has already been saved as described above, then the resource holding the return pointer will hold an instrumented address.

During uninstrumentation, on returning from bar( ) 306 no branch back to its instrumented caller foo'( ) 310 must be taken, because the shared memory segment containing foo'( ) 310 may already have been unmapped and foo'( ) 310 may no longer be present in the current context. In one embodiment, a processor such as, for example, processor 104 of FIG. 1 in conjunction with instructions, residing, for example, in RAM 106, ROM 108, and/or data storage device 110, comprise an apparatus which operates to perform step 206.

With reference now to step 208, the present embodiment also executes the process which is being uninstrumented and, provided the process generates a fault by seeking to access an address in instrumented code space, provides a corresponding address in the uninstrumented code space. More specifically, in one embodiment, the present invention executes the process being uninstrumented and checks for segment faults (i.e. faults generated by seeking to access the now unmapped instrumented code space). When such a fault is detected, the present embodiment then corrects the fault by providing an address in the uninstrumented code space which corresponds to the fault-generating address in the instrumented code space. In one embodiment, a processor such as, for example, processor 104 of FIG. 1 in conjunction with instructions, residing, for example, in RAM 106, ROM 108, and/or data storage device 110, comprise an apparatus which operates to perform step 208.

Figure 4:
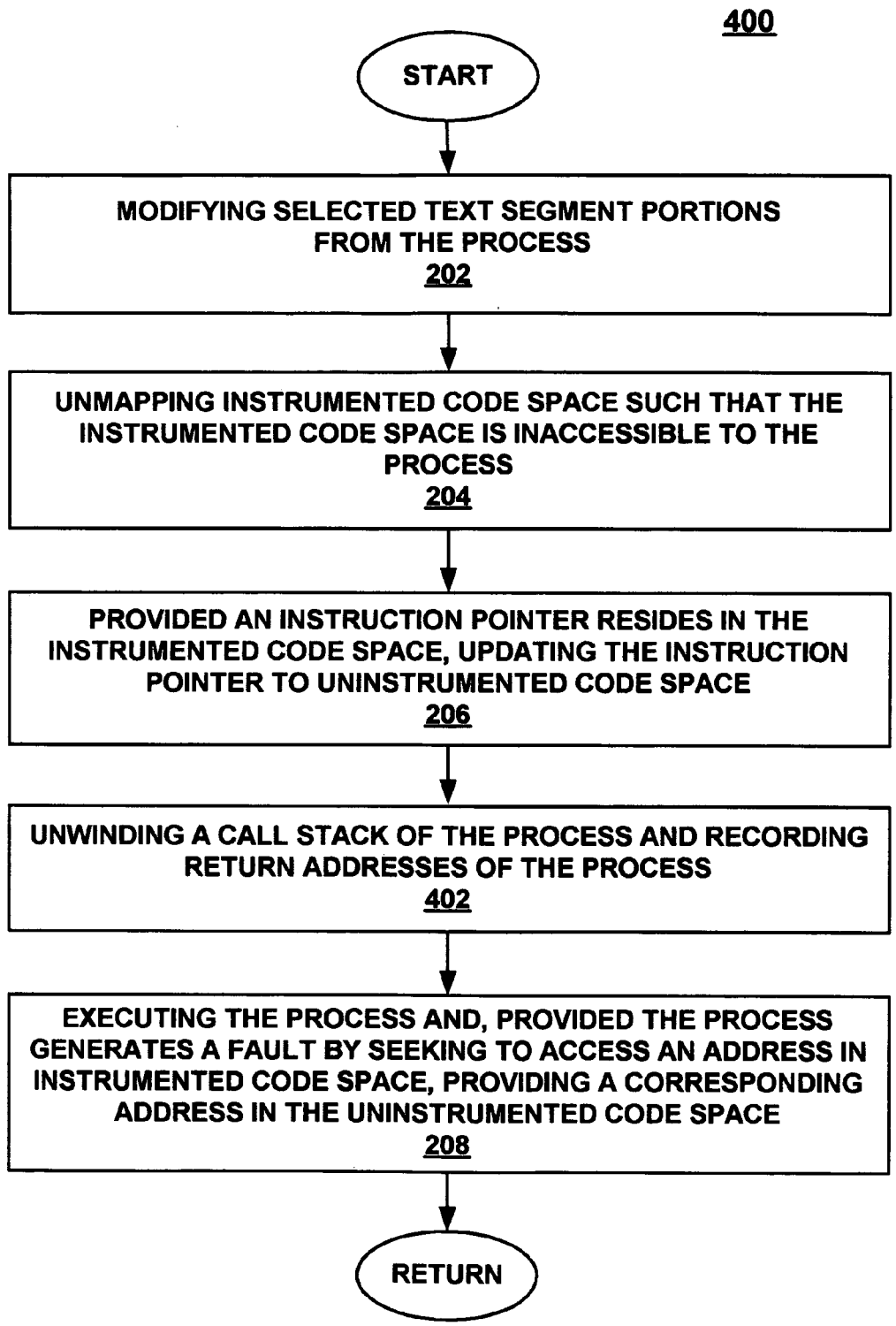
FIG. 4 is a flow chart of steps performed in accordance with another embodiment of the present claimed invention.

With reference now to FIG. 4, a flow chart 400 of steps performed in accordance with another embodiment of the present invention is shown. The method of the present embodiment includes steps 202, 204, 206, and 208 of FIG. 2. These steps were described above in detail in conjunction with the description of FIG. 2, and are not repeated herein for purposes of brevity and clarity. The method of the present embodiment as described in FIG. 4 also includes new step 402. At step 402, the present embodiment unwinds the call stack of the process being uninstrumented and records return addresses of the process. In one embodiment, a processor such as, for example, processor 104 of FIG. 1 in conjunction with instructions, residing, for example, in RAM 106, ROM 108, and/or data storage device 110, comprise an apparatus which operates to perform step 402.

Figure 5:
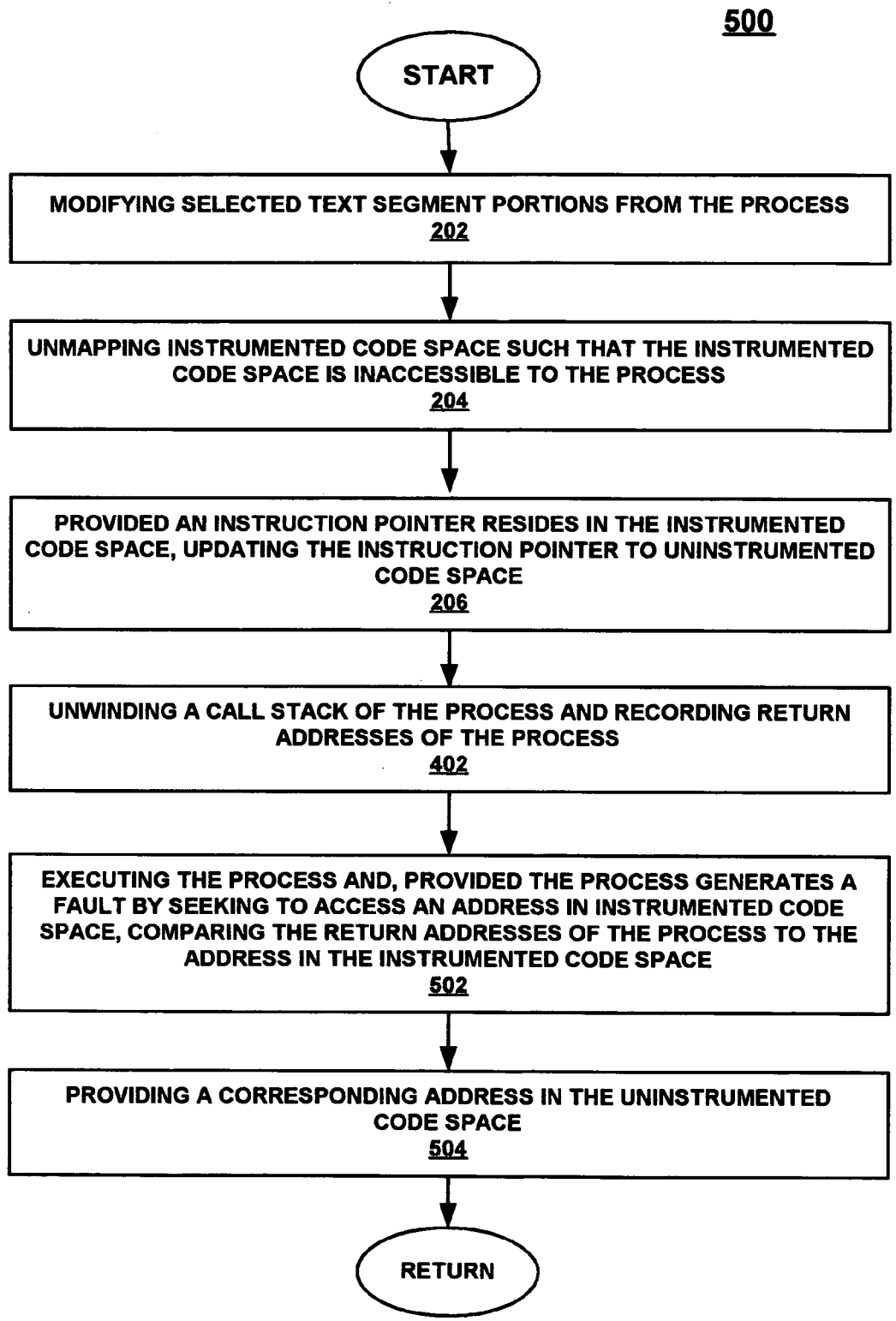
FIG. 5 is a flow chart of steps performed in accordance with yet another embodiment of the present claimed invention.

With reference now to FIG. 5, a flow chart 500 of steps performed in accordance with another embodiment of the present invention is shown. The method of the present embodiment includes steps 202, 204, and 402 of FIG. 4. These steps were described above in detail in conjunction with the description of FIG. 4, and are not repeated herein for purposes of brevity and clarity. The method of the present embodiment as described in FIG. 5 also includes new steps 502 and 504. At step 502, the present embodiment executes the process which is being uninstrumented and, provided the process generates a fault by seeking to access an address in instrumented code space, compares the return addresses of the process (i.e. those return addresses recorded at step 402) to the address in the instrumented code space which generated the fault upon execution of said process. In so doing, the present embodiment provides evidence that the fault is due to an invalid return address (i.e. a return address which resides in unmapped instrumented code space). In one embodiment, a processor such as, for example, processor 104 of FIG. 1 in conjunction with instructions, residing, for example, in RAM 106, ROM 108, and/or data storage device 110, comprise an apparatus which operates to perform step 502.

At step 504, the present embodiment then corrects the fault by providing an address in the uninstrumented code space which corresponds to the fault-generating address in the instrumented code space. In one embodiment, a processor such as, for example, processor 104 of FIG. 1 in conjunction with instructions, residing, for example, in RAM 106, ROM 108, and/or data storage device 110, comprise an apparatus which operates to perform step 504.

Figure 6:
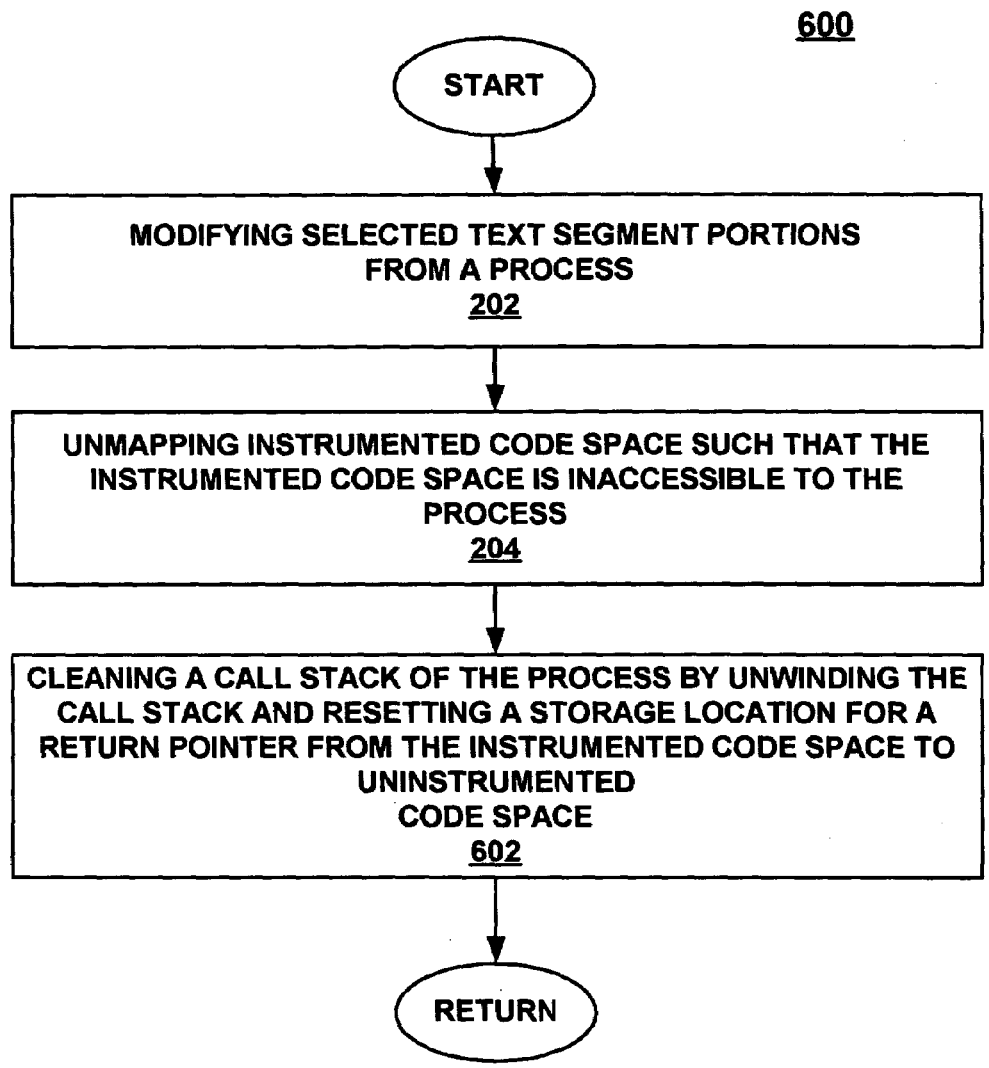
FIG. 6 is a flow chart of steps performed in accordance with another embodiment of the present claimed invention.

General Method and System for Uninstrumenting In-Line Code Instrumentation via Stack Unwinding and Cleanup With reference now to FIG. 6, a flow chart 600 of steps performed in accordance with another embodiment of the present invention is shown. As an overview, the present embodiments, as are described below in detail, solve the problem caused by the fact that if conventional unwinding approaches are used, the call-tree "goes through" instrumented functions and will return through these instrumented functions. An example will help to make things clear. Assume function main( ) calls function foo( ) which calls function bar( ). In unwinding the call stack, after function bar( ) is reached it is decided to uninstrument the process. In such an instance, the dynamically generated/instrumented code and its return chain will look, after bar( ) has been reached, as follows:

```
main( )        foo( )         bar( )
{              {              {
  foo( );        bar( );       ...
  ...            ...           /* Point A: start un-instrumentation */
}              }              ...
                              }
```

After instrumentation, this call chain looks like this

```
main( )    ->    main_instrumented( )
(brl)            main_instrumented( ) -> foo_instr( )
                                         foo_instr( ) -> bar_instr( )
```

Thus, even if all original code is restored and control is transferred from bar_instr( ) to bar( )—

```
main( )  ->  main_instrumented( )
             main_instrumented( ) -> foo_instr( )
                                     foo_instr( ) -> bar_instr( )
                                     /* change to corresponding
                                     instruction in */
                                     = => bar( )
``` when bar( ) returns, the return pointer (rp) will have an address residing in foo_instr( ), since this is where the original call was located. Therefore, if during detaching, uninstrumentation, or forking, foo_instr( ) is no longer available (freed, or it is not desired that execution go there), a problem is created. As can be seen from the above example, uninstrumentation requires not only to restore original text, but also to "clean up" the return chain. The method of the present embodiment handles such a problem. Specifically, the method of the present embodiment includes steps 202 and 204 of FIG. 2. These steps were described above in detail in conjunction with the description of FIG. 2, and are not repeated herein for purposes of brevity and clarity. The method of the present embodiment as described in FIG. 6 also includes new step 602. At step 602, the present embodiment cleans a call stack of a process by unwinding the call stack and resetting return pointers from instrumented code space to uninstrumented code space. As mentioned above in conjunction with the detailed description of steps 202 and 204, in one embodiment, the instrumented code space is comprised of shared memory.

As mentioned above, in certain environments such as, for example, IA-64 Itanium processor architecture by Intel Corporation of Santa Clara, Calif., the runtime architecture defines function calls, preserved registers, and conventions for passing parameters. For purposes of the below explanation, one method of the present invention is described as it would be implemented in such an environment. It should be understood, however, that such an example is exemplary only, and the present invention is not limited solely to use in such an environment. Furthermore, it should be noted that the unwind process which is readily performed in certain environments is particularly problematic in an IA-64 architecture. As one specific example, in the IA-64 architecture, unlike most architectures, return pointers are not stored in a common fixed location. As a result, unwind operations in the IA-64 environment are made especially difficult.

With reference still to step 602, unlike the embodiments described above in conjunction with FIGS. 2–5, the present embodiment cleans up the call stack of the process being uninstrumented without requiring the waiting for generation of segment faults. Also, as was mentioned above, in an IA-64 architecture, a system library "libunwind" is employed to facilitate the unwind process. Hence, in one embodiment, the present invention augments the functionality of the libunwind mechanism to include the ability to clean a call stack of a process by unwinding the call stack and resetting the storage location of a return pointer from instrumented code space to uninstrumented code space as is recited in step 602 of FIG. 6. As a result, the present embodiment reverts a process in an in-line instrumented state to an uninstrumented state, and does so without requiring the generation of segment faults. In one embodiment, a processor such as, for example, processor 104 of FIG. 1 in conjunction with instructions, residing, for example, in RAM 106, ROM 108, and/or data storage device 110, comprise an apparatus which operates to perform step 602.

Figure 7:
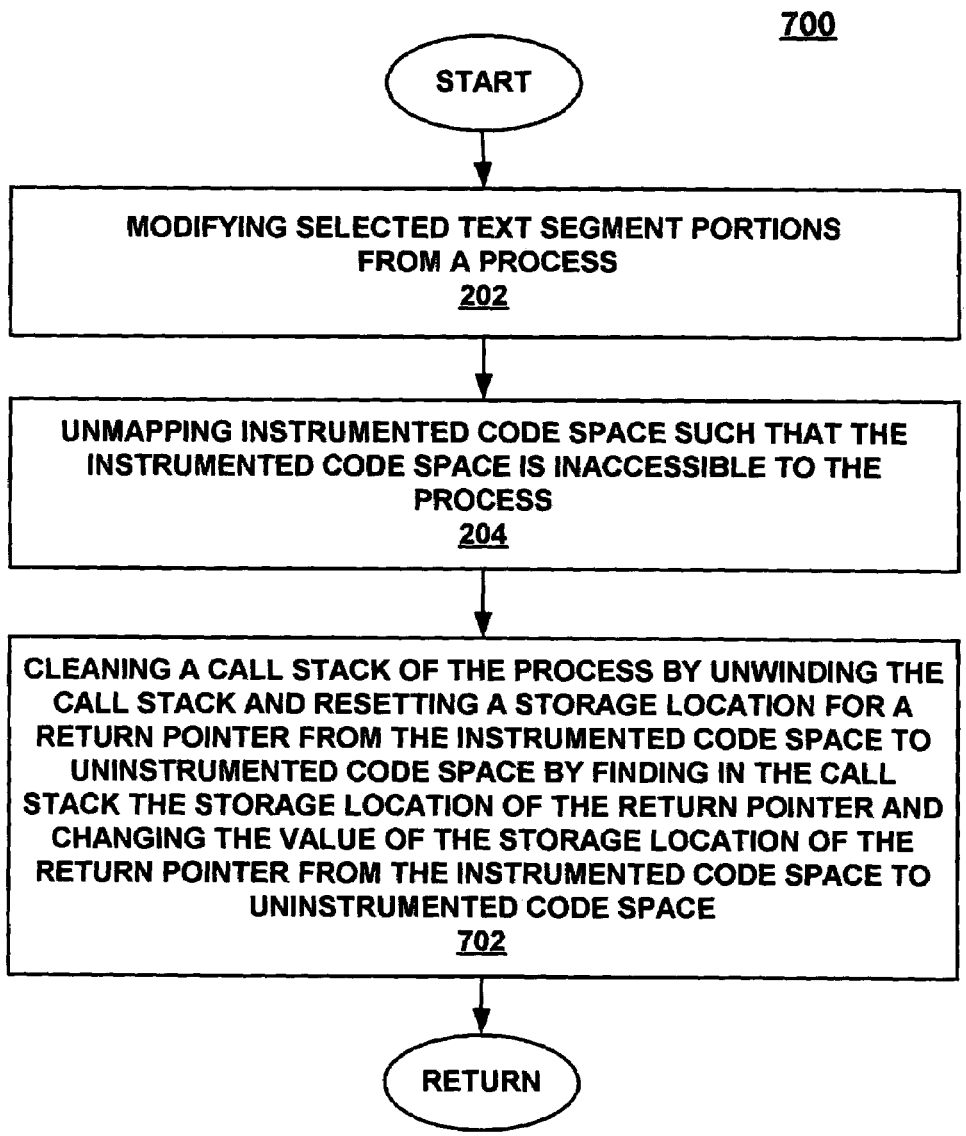
FIG. 7 is a flow chart of steps performed in accordance with yet another embodiment of the present claimed invention.

With reference now to FIG. 7 a flow chart 700 of steps performed in accordance with another embodiment of the present invention is shown. The method of the present embodiment includes steps 202 and 204 of FIG. 2. These steps were described above in detail in conjunction with the description of FIG. 2 and are not repeated herein for purposes of brevity and clarity. The method of the present embodiment as described in FIG. 7 also includes new step 702. Step 702 includes all of the features of step 602 and also recites additional processes. Specifically, at step 702 the present embodiment cleans a call stack of a process by unwinding the call stack and resetting the storage location for the return pointer from instrumented code space to uninstrumented code space by finding in the call stack the storage location of the return pointer and changing the value of the storage location of the return pointer from the instrumented code space to uninstrumented code space. In one embodiment, a processor such as, for example, processor 104 of FIG. 1 in conjunction with instructions, residing, for example, in RAM 106, ROM 108, and/or data storage device 110, comprise an apparatus which operates to perform step 702.

Referring still to step 702 of FIG. 7, as was stated above, in the IA-64 architecture, unlike most architectures, return pointers are not stored in a common fixed location. As a result, unwind operations in the IA-64 environment are made especially difficult. Thus, in the present embodiment, the present invention must first determine the location of the return pointers. For purposes of illustration, examples are provided citing how to change the value of the return pointers which are located in a renamed register, disposed in a memory location on the call stack, disposed in a preserved register, disposed in an alternate branch register, wherein the return pointer is not yet saved, and where the return pointer is disposed in a memory location within the underlying operating system. Although such specific instances are cited herein, the present embodiment is also well suited to locating and changing the value of return pointers having various other characteristics. Additionally, the following examples of how to change the value of the return pointers also pertains to the embodiment of FIG. 6.

Referring again to step 702 of FIG. 7, in one embodiment, since unwinding and the interpretation of related unwind information can be very complex, the stack unwinding mechanism is comprised of a functionality found in a system library, libunwind. In such an approach, libunwind provides the ability to unwind through another process. This allows having all mapping tables and other needed functions in the instrumenting/uninstrumenting application and requires no further code and data injection into the target process (i.e. the process being uninstrumented). In one approach, the instrumenting/uninstrumenting application is comprised of the Caliper application by Hewlett-Packard Company of Palo Alto, Calif. The present invention is, however, well suited to use with various other instrumenting/uninstrumenting applications and various other mechanisms to perform an unwind process.

A step 702, the present embodiment finds the "location" of the stored return pointers via interpreting unwind information. The present embodiment then resets the return pointer values found in these locations of the from instrumented code space to uninstrumented code space. Specific examples for the above-mentioned six locations (i.e. 1) renamed registers, 2) memory locations on the call stack, 3) preserved registers, 4) alternate return pointer, 5) return pointer not yet saved, and 6) return pointer resides is the kernel) are listed below.

Return Pointer in Renamed Register

As one example, during operation, the IA-64 architecture avoids unnecessary spilling and filling of registers at procedure call and return interfaces through compiler-controlled renaming with help of the "alloc" instruction. Consider the following example, function foo that calls function bar. Function foo stores the ar.pfs register in the renamed register r40 and the return pointer in r41.

```
// foo
// 1) uses a renamed register to store
// ar.pfs   -> r40
// rp       -> r41
foo:
    alloc       r40=ar.pfs, 0, 12, 3, 0
    mov         r41 =rp
    [...]
    br.dptk     bar
    [...]
    mov         rp=r41
    mov         ar.pfs=r40
    br.ret.dptk rp
```

During unwinding, the present embodiment finds this information about r40, r41, ar.pfs and rp in the unwind information. Such unwind information may might look like the following for above code example:

| | | |
|---|---|---|
| 1 R1prologue | | rlen=n |
| 2 P7rp_when | | t/spoff/pspoff=1 |
| 3 P3rp_gr | | gr/br=41 |
| 4 P7pfs_when | | t/spoff/pspoff=0 |
| 5 P3pts_gr | | gr/br=40 |
| 6 ... | | |

The unwind library then interprets this information to locate the saved values for rp and ar.pfs on the register stack.

Thus, after returning from function bar, function foo restores rp and ar.pfs from the renamed registers, which can be found on the register stack. If uninstrumentation starts in function bar, during unwinding, the instrumenting/uninstrumenting application (e.g. the Caliper application) changes these values in the storage location (r41 in this example) from instrumented addresses to their original uninstrumented counterparts. Thus, when execution continues and the control flow finally returns to the point after the call to bar, the registers r41 will contain non-instrumented addresses, and execution will return through non-instrumented functions.

Return Pointer Located on the Call Stack

In this example, during operation, the IA-64 architecture may also spill and fill values of preserved registers to and from the memory stack. Consider the following example, function foo calls function bar. Function foo stores the ar.pfs register in the renamed register r40 and the return pointer on the call stack.

```
// foo
// 2) uses a stack location to store rp
foo:
    alloc       r40=ar.pfs,0,12,3
    adds        r17=0, sp              // store sp in r17
    addl        r40=0, rl;;
    adds        sp=-112,sp             // set up a frame with 7 slots
    adds        r18=-32, r17           // slot 2
    st8.spill   [r18]=rp,32            // save rp to the stack
    [...]
    br.dptk bar
    [...]
    adds        r9=112, sp;;
    adds        r10=-32, r9
    adds        sp=0, r9
    ld8.fill    rp=[r10],32;;
    mov         ar.pfs=r40
    br.ret.dptk rp
```

During uninstrumentation, the present embodiment finds this information about r40, ar.pfs, rp and its location on the stack relative to sp or a value derived from sp in the unwind information, which might look like the following for above code example:

```
1 R1prologue                      rlen=n
2 P7pfs_when                      t/spoff/pspoff=0
3 P3pfs_gr                        gr/br=40
4 P7mem_stack_f size=7            t/spoff/pspoff=4
5 instructions to locate rp on this stack frame
```

In this embodiment, the unwind library interprets this information to locate the saved values for rp on the memory stack. The idea for this example is basically the same as above. That is, after returning from function bar, function foo restores rp from the stack. During uninstrumentation, the instrumenting/uninstrumenting application changes these values in the storage location for the return pointer from instrumented addresses to their original counterparts. Thus, when execution continues and the control flow finally returns to the point after the call to bar, the call stack locations will contain non-instrumented addresses and execution will return through non-instrumented functions.

Return Pointer in a Preserved Register

In this example, during operation, the IA-64 architecture may also buffer return pointer values in preserved registers. Consider the following example, function foo calls function bar. Function foo stores the ar.pfs register in the renamed register r40 and the return pointer in the preserved register r5 (which it must have saved somewhere earlier, and which is not shown in the following code section).

```
// foo
// 3) uses a preserved register to store rp
foo:
    alloc       r40=ar.pfs,0,12,3
    addl        sp=sp,16           // save r5
    mov         [sp] = r5          // to the memory stack - or
                                   somewhere
    mov         r5=rp              // buffer rp in r5
    br.dptk bar
    mov         rp=r5              // restore rp from preserved register
    addl        sp=sp,-16
    mov         ar.pfs=r40
    br.ret.dptk rp
```

In the following discussion, r5 is used as a placeholder for any preserved register. In the case where the function foo is the current call-tree top, at the point where unwinding is initiated, the unwind information has to be interpreted. If rp has already been saved to r5, r5 must be changed to non-instrumented code space. However, if rp has already been saved to r5, but r5 has been saved and modified, the saved location (or its transitive) must be changed to non-instrumented code space.

In the case where the function foo is somewhere within the call-tree and again rp has been saved to r5, several scenarios are possible. In the first scenario, function foo calls function $bar_0$, which calls $bar_1$ etc. None of these functions modifies and/or saves r5. The present embodiment detects this condition by interpreting the unwind information. In such a case, r5 is changed to a corresponding non-instrumented code space target address.

In the next scenario, a function foo calls function $bar_0$, which calls $bar_1$ etc. In this example, function $bar_n$ modifies r5 and therefore (since r5 is preserved register) has to save this register somewhere, either in a renamed register, on the stack or in another preserved register. The present embodiment again finds this saved location by interpreting the unwind information and changes the rp to a corresponding non-instrumented code space target address. In the present embodiment, this save-chain has to be evaluated transitively, or recursively. Furthermore, in one embodiment, the present invention augments the functionality of a system library "libunwind" to know/learn the exact location of the stored rp. That is, in order to successfully un-instrument the call tree, the present embodiment employs a callback-type mechanism that allows changing these stored locations (wherever they are) from an instrumented address to their original uninstrumented address.

Alternate Return Pointer

In this example, during operation, the IA-64 architecture may also use an alternate branch register as the return pointer. In this case, during unwind, the "save" location for this alternate register must be searched, just like for rp. In the case where the return pointer is in the call tree top or the alternate return register has not been modified yet, the present embodiment changes this alternate branch register. The following code section illustrates such an example.

```
// foo
// 3) uses a alternate return pointer
foo:
    alloc       r40=ar.pfs,0,12,3
    mov         b3=rp              // buffer rp in b3
    [...]
    br.dptk bar
    [...]
    mov         ar.pfs=r40
    br.ret.dptk b3
```

Return Pointer Not Yet Saved

The present invention is also well suited to the embodiment where the return pointer has not yet been saved at its location (wherever that location may be). In such a case, the present embodiment stores therein the appropriate address in uninstrumented code space. Thus, when execution continues registers of the return pointer will contain non-instrumented addresses, and execution will return through non-instrumented functions.

Return Pointer is Saved in the Operating System

The present embodiment is also well suited to dealing with the instance where the IA-64 architecture, for example, has allowed the return pointer to be saved at a location in the underlying operating system. In such a case, the present embodiment will check all threads of the process (including any threads in a wait state) and change the return pointers to non-instrumented code space.

Thus, the present invention provides a method and system for reverting a process in an in-line instrumented state to an uninstrumented state. The present invention further provides a method and system for reverting a process in an in-line instrumented state to an uninstrumented state when return pointers of the process are not stored in a common fixed location.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

The invention claimed is:

1. A computer-implemented method for reverting a process in an in-line instrumented state to an uninstrumented state, said method comprising:

modifying selected text segment portions from said process which has been instrumented;

unmapping instrumented code space such that said instrumented code space is inaccessible to said process;

cleaning a call stack of said process by unwinding said call stack and resetting a storage location for a return pointer from said instrumented code space to uninstrumented code space wherein said cleaning is performed on said process which has been instrumented, and comparing the return addresses of the process to the address in the instrumented code space which generated a fault upon execution of said process when the process generates the fault by seeking to access an address in instrumented code space.

2. The computer-implemented method for reverting a process in an in-line instrumented state to an uninstrumented state as recited in claim 1 wherein said instrumented code space is comprised of shared memory or memory in an address space of said process.

3. The computer-implemented method for reverting a process in an in-line instrumented state to an uninstrumented state as recited in claim 1 wherein the step of resetting said storage location for said return pointer comprises:

finding in said call stack said storage location of said return pointer; and changing the value of said storage location of said return pointer from said instrumented code space to uninstrumented code space.

4. The computer-implemented method for reverting a process in an in-line instrumented state to an uninstrumented state as recited in claim 1 wherein said return pointer is disposed in a renamed register.

5. The computer-implemented method for reverting a process in an in-line instrumented state to an uninstrumented state as recited in claim 1 wherein said return pointer is disposed in a memory location on said call stack.

6. The computer-implemented method for reverting a process in an in-line instrumented state to an uninstrumented state as recited in claim 1 wherein said return pointer is disposed in a preserved register.

7. The computer-implemented method for reverting a process in an in-line instrumented state to an uninstrumented state as recited in claim 1 wherein said return pointer is disposed in an alternate branch register.

8. The computer-implemented method for reverting a process in an in-line instrumented state to an uninstrumented state as recited in claim 1 wherein said return pointer is not yet saved.

9. The computer-implemented method for reverting a process in an in-line instrumented state to an uninstrumented state as recited in claim 1 wherein said return pointer is disposed in a memory location of an operating system of said process.

10. A computer-readable medium embodying instructions that cause a computer to perform a method for reverting a process in an in-line instrumented state to an uninstrumented state, the method comprising:

modifying selected text segment portions from said process which has been instrumented;

unmapping instrumented code space such that said instrumented code space is inaccessible to said process;

cleaning a call stack of said process by unwinding said call stack and resetting a storage location for a return pointer from said instrumented code space to uninstrumented code space wherein said cleaning is performed on said process which has been instrumented, and comparing the return addresses of the process to the address in the instrumented code space which generated a fault upon execution of said process when the process generates the fault by seeking to access an address in instrumented code space.

11. The computer-readable medium of claim 10 wherein said instrumented code space is comprised of shared memory or memory in an address space of said process.

12. The computer-readable medium of claim 10 wherein said instructions further cause said computer to: find in said call stack said storage location of said return pointer; and change the value of said storage location of said return pointer from said instrumented code space to uninstrumented code space.

13. The computer-readable medium of claim 10 wherein said return pointer is disposed in a renamed register.

14. The computer-readable medium of claim 10 wherein said return pointer is disposed in a memory location on said call stack.

15. The computer-readable medium of claim 10 wherein said return pointer is disposed in a preserved register.

16. The computer-readable medium of claim 10 wherein said return pointer is disposed in an alternate branch register.

17. The computer-readable medium of claim 10 wherein said return pointer is not yet saved.

18. The computer-readable medium of claim 10 wherein said return pointer is disposed in a memory location of an operating system of said process.

19. An apparatus for reverting a process in an in-line instrumented state to an uninstrumented state, the apparatus comprising:

means for modifying selected text segment portions from said process which has been instrumented;

means for unmapping instrumented code space such that said instrumented code space is inaccessible to said process;

means for cleaning a call stack of said process by unwinding said call stack and resetting a storage location of a return pointer from said instrumented code space to uninstrumented code space wherein said cleaning is performed on said process which has been instrumented, and comparing the return addresses of the process to the address in the instrumented code space which generated a fault upon execution of said process when the process generates the fault by seeking to access an address in instrumented code space.

20. The apparatus of claim 19 for reverting a process in an in-line instrumented state to an uninstrumented state wherein said instrumented code space is comprised of shared memory or memory in an address space of said process.

21. The apparatus of claim 19 for reverting a process in an in-line instrumented state to an uninstrumented state wherein said means for cleaning up said call stack further comprises:
   means for finding in said call stack said storage location of said return pointer; and
   means for changing the value of said storage location for said return pointer from said instrumented code space to uninstrumented code space.

22. The apparatus of claim 19 for reverting a process in an in-line instrumented state to an uninstrumented state wherein said return pointer is disposed in a renamed register.

23. The apparatus of claim 19 for reverting a process in an in-line instrumented state to an uninstrumented state wherein said return pointer is disposed in a memory location on said call stack.

24. The apparatus of claim 19 for reverting a process in an in-line instrumented state to an uninstrumented state wherein said return pointer is disposed in a preserved register.

25. The apparatus of claim 19 for reverting a process in an in-line instrumented state to an uninstrumented state wherein said return pointer is disposed in an alternate branch register.

26. The apparatus of claim 19 for reverting a process in an in-line instrumented state to an uninstrumented state wherein said return pointer is not yet saved.

27. The apparatus of claim 19 for reverting a process in an in-line instrumented state to an uninstrumented state wherein said return pointer is disposed in a memory location of an operating system of said process.

* * * * *